US011172787B2

(12) United States Patent
Verville et al.

(10) Patent No.: US 11,172,787 B2
(45) Date of Patent: Nov. 16, 2021

(54) FOOD PRODUCT DISPENSER VALVE NORMALLY BIASED INTO CLOSED POSITION

(71) Applicant: SUMMIT PACKAGING SYSTEMS, INC., Manchester, NH (US)

(72) Inventors: Kevin G. Verville, Deerfield, NH (US); Elizabeth A. Heron, Kingston, NH (US)

(73) Assignee: SUMMIT PACKAGING SYSTEMS, INC., Manchester, NH (US)

( * ) Notice: Subject to any disclaimer, the term of this patent is extended or adjusted under 35 U.S.C. 154(b) by 0 days.

(21) Appl. No.: 16/808,756

(22) Filed: Mar. 4, 2020

(65) Prior Publication Data

US 2021/0274978 A1    Sep. 9, 2021

(51) Int. Cl.
*A47J 43/12* (2006.01)
*B65D 83/48* (2006.01)

(52) U.S. Cl.
CPC ............ *A47J 43/128* (2013.01); *B65D 83/48* (2013.01)

(58) Field of Classification Search
CPC ........ A47J 43/128; B65D 83/48; B65D 83/46
See application file for complete search history.

(56) References Cited

U.S. PATENT DOCUMENTS

| 2,487,434 | A | * | 11/1949 | Geiss | ..................... | B65D 83/46 |
|||||||222/402.23|
| 2,612,293 | A | * | 9/1952 | Michel | ................... | B65D 83/46 |
|||||||222/182|
| 2,704,172 | A | | 3/1955 | Lapin | | |
| 2,729,368 | A | | 1/1956 | Lapin et al. | | |
| 2,772,035 | A | * | 11/1956 | Collins | ................... | B65D 83/46 |
|||||||222/402.23|
| 2,775,483 | A | | 12/1956 | Treharne, Jr. et al. | | |
| 2,892,575 | A | * | 6/1959 | Turk | ..................... | B65D 83/46 |
|||||||222/394|
| 2,954,903 | A | * | 10/1960 | Collins | ................... | B65D 83/46 |
|||||||222/402.23|

(Continued)

FOREIGN PATENT DOCUMENTS

EP    0816254 A1    1/1998
GB    1244404        9/1972

*Primary Examiner* — Vishal Pancholi
*Assistant Examiner* — Bob Zadeh
(74) *Attorney, Agent, or Firm* — Finch & Maloney, PLLC; Michael J. Bujold; Jay S. Franklin

(57) ABSTRACT

A food product dispenser valve which comprises a mounting cup which has a grommet/stem opening formed therein; a grommet defining an axial passageway which extends along an axial length of the grommet and has a sealing edge formed in an upstream end thereof, and a body of the grommet extends through the grommet/stem opening; a valve stem accommodated within the passageway, and the valve stem has a sealing head which is spaced apart from a valve stem shoulder; and a dispensing actuator surrounds a portion of the body of the grommet which extends through the grommet/stem opening, and has a product discharge outlet. The spacing of the sealing head from the valve stem shoulder is less than an axially height of the grommet so that the grommet normally biases the sealing head into sealing engagement with the annular sealing edge to prevent flow through the food product dispenser valve.

18 Claims, 13 Drawing Sheets

VALVE OPEN (TILT ACTION)

(56) References Cited

U.S. PATENT DOCUMENTS

| | | | |
|---|---|---|---|
| 3,300,105 A * | 1/1967 | Rosen | B65D 83/46 222/517 |
| 3,674,186 A | 7/1972 | Ewald | |
| 3,722,760 A * | 3/1973 | Hug | B65D 83/46 222/402.22 |
| 3,954,208 A * | 5/1976 | Brill | B65D 83/46 222/402.23 |
| 4,008,834 A | 2/1977 | Towns | |
| 4,389,004 A * | 6/1983 | Bon | B65D 83/425 222/402.22 |
| 4,856,684 A * | 8/1989 | Gerstung | B65D 83/46 222/402.23 |
| 4,958,755 A * | 9/1990 | Gerstung | B65D 83/46 222/402.23 |
| 5,553,755 A | 9/1996 | Bonewald et al. | |
| 6,607,106 B2 | 8/2003 | Henry et al. | |
| 6,817,494 B2 | 11/2004 | Lilienthal | |
| 7,168,684 B2 | 1/2007 | Marroncles et al. | |
| 7,350,676 B2 | 4/2008 | Di Giovanni et al. | |
| 7,984,834 B2 | 7/2011 | McBroom et al. | |
| 8,419,411 B2 | 4/2013 | Clauwaert et al. | |
| 8,511,521 B1 | 8/2013 | McBroom et al. | |
| 8,905,273 B2 | 12/2014 | de Schrijver | |
| 9,399,544 B2 | 7/2016 | Dhaenens et al. | |
| 9,434,529 B2 | 9/2016 | McBroom et al. | |
| 9,446,894 B2 | 9/2016 | Martz et al. | |
| 10,266,334 B2 | 4/2019 | Baker et al. | |

* cited by examiner

3-ARM ACTUATOR

VALVE CLOSED

OPEN DURING FILLING

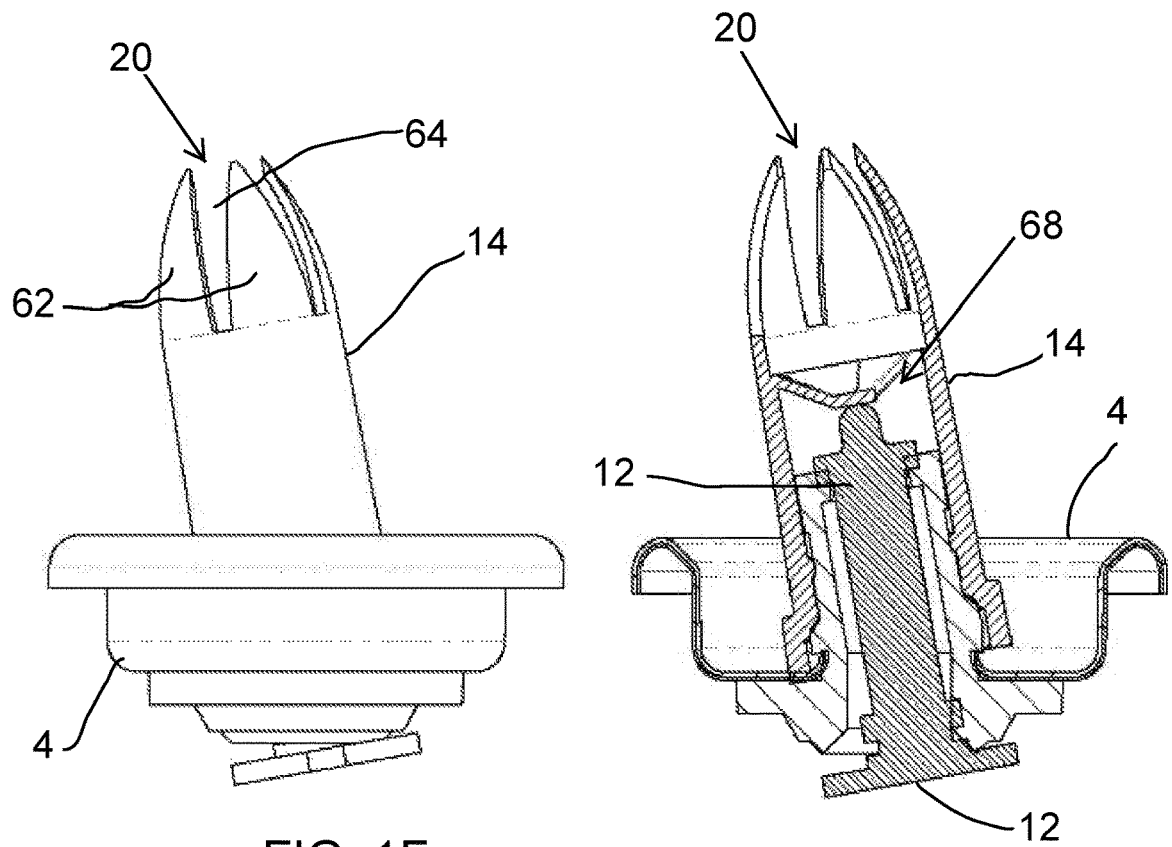
FIG. 1F
VALVE OPEN (TILT ACTION)
FIG. 1G
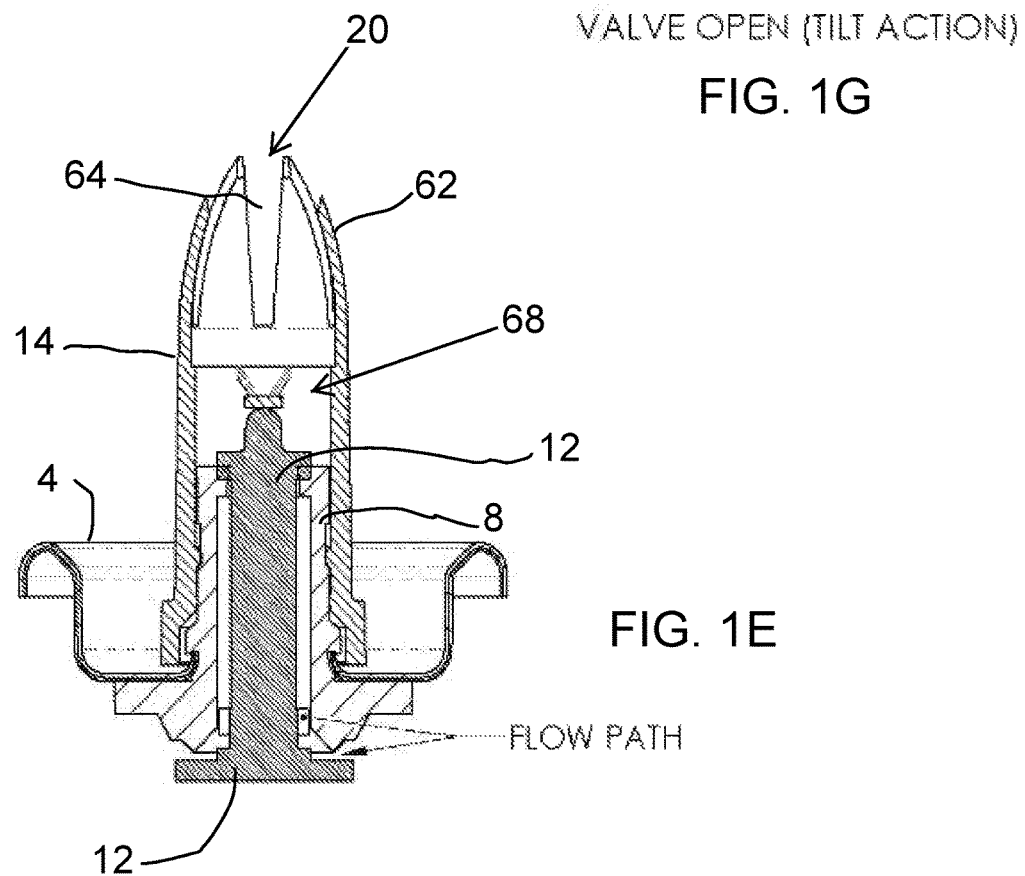
FIG. 1E

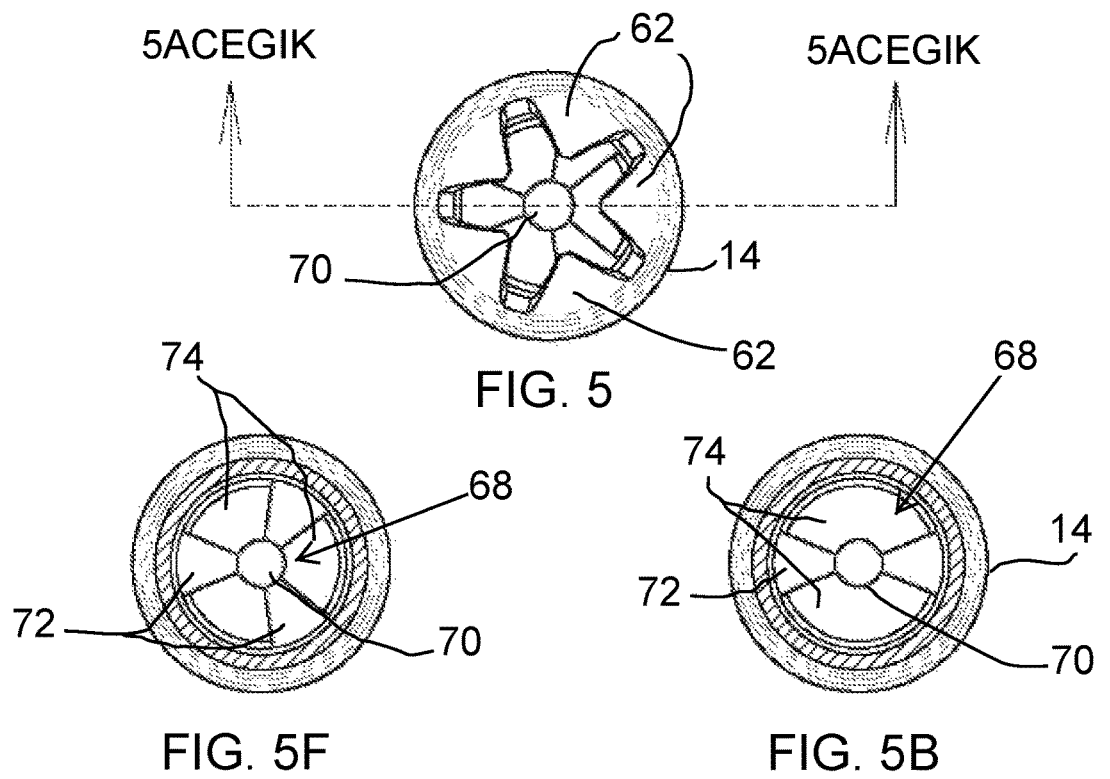
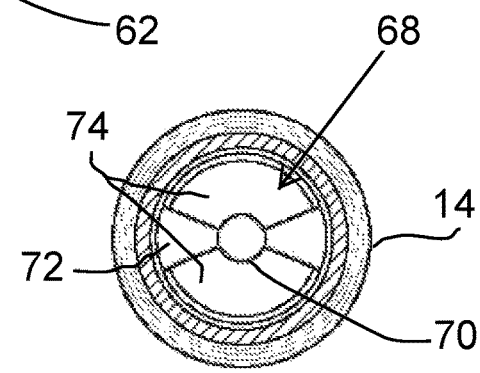
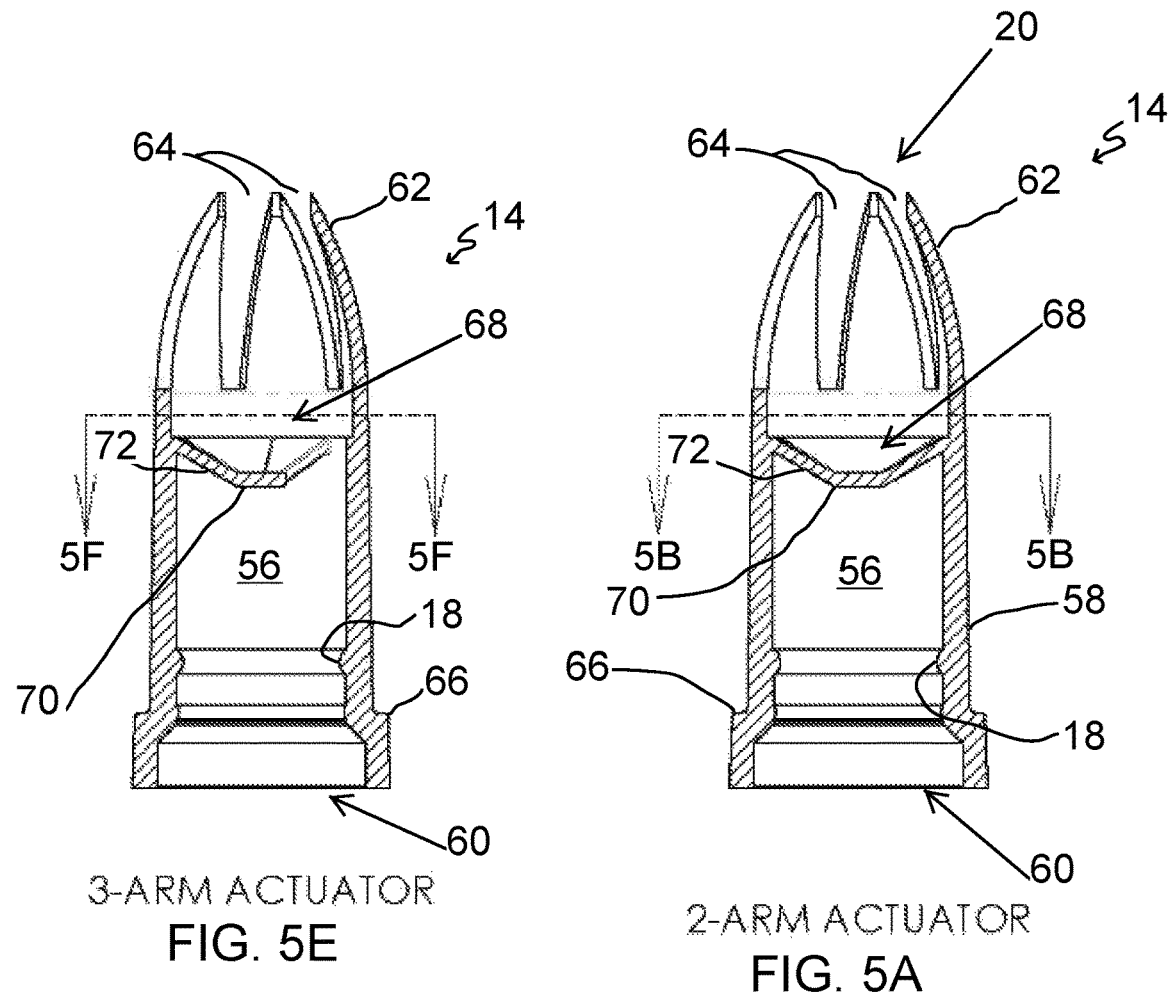

4-ARM FAN ACTUATOR

2-ARM FAN ACTUATOR

4-ARM ACTUATOR

3-ARM FAN ACTUATOR

FOOD PRODUCT DISPENSER VALVE NORMALLY BIASED INTO CLOSED POSITION

FIELD OF THE INVENTION

The present invention relates to a food product dispenser valve, for reliably dispensing a food product (such as whipped cream), which is normally biased into a closed position so as to prevent the flow of the food product out of the container, even when the internal chamber is at a low pressure or not yet pressurized. The food product dispenser valve also assists with filling of a pressurizable container, equipped with the food product dispenser valve, with a desired propellant (and possibly a desired food product) as well as inducing swirling motion to the food product as the food produce is dispensed via the food product dispenser valve.

BACKGROUND OF THE INVENTION

This invention relates to whipped cream dispensers. More specifically, this invention relates to a whipped cream dispenser comprising an aerosol-type container having a discharge valve which is opened by tilting the valve spout, and includes means for limiting the tilting of the spout and relieving stress on the stem.

Since at least the 1950's there have been various patents disclosing pressurized containers for food products, such as whipped cream, in which a flexible spout is mounted in the opening of the container. The spout receives the stem of a relatively rigid valve element which terminates downstream in a valve head normally seated in the inlet of the spout. During operation, the container is inverted and the spout is tipped causing the stem to unseat the valve head, thereby permitting the discharge of some of the food product from the container. The stem often includes a deflector which assists with foaming and guiding the fluid to an expansion chamber in the spout. Frequently the upper end of the spout has inwardly curving petals which form a "tulip" top to focus the discharge of the product and assist with reducing spatter.

One drawback associated with currently known food product dispenser valves, using a tilt-type aerosol valve, is that the tilt-type aerosol valve does not consistently and reliably seal after dispensing food product, especially when the internal pressure of the container is at a low pressure, e.g., when about 50-85% of the food product content, for example, has been dispensed from the container.

Another associated drawback with currently known food product dispenser valves is that they do not assist with consistently and reliably unseating the valve to assist with filling of the food product into the container during the filling operation.

A still further associated drawback with currently known food product dispenser valves is that they do not assist with adequate mixing or creating turbulence of the food product, prior to the same being discharged from the food product dispenser valve.

Currently known food product dispenser valves also are not designed to assist with the dispensing actuator activating the valve stem to assist with initially charging of the pressurizable container with a propellant, and possibly the desired food product if this has not been previously loaded within the pressurizable container.

SUMMARY OF THE INVENTION

Wherefore, it is an object of the present invention to overcome the above mentioned shortcomings and drawbacks associated with the prior art.

Another object of the present invention is to provide a food product dispenser valve which consistently and reliably seals against a mating valve seat so as to prevent any undesired flow of the food product from the container.

A further object of the present invention is to provide either an axially longer grommet or an axially shorter valve stem so that the sealing head of the valve stem is normally biased, by either the longer axial length of the grommet or the axially shorter length of the valve stem, into continuous sealing engagement with a mating annular sealing edge or surface of the grommet so as to continuously and constantly prevent the flow of the food product therethrough until actuated.

Yet another object of the present invention is to provide a valve stem pusher or activator, of the food product dispenser valve, with two or more radially inwardly extending the vanes which have a desired pitch that assists with inducing a desire swirling motion to the food product, as a food product flows there past prior to discharge from the food product dispenser valve.

A still further object of the present invention is to permit the dispensing actuator to move axially, over limited range of motion, with respect to an exterior surface of the grommet to assist with initially charging/filling of the pressurizable container, incorporating the food product dispenser valve, with a desired propellant and possibly a desired food product, if the desired food product was not previously loaded within the pressurizable container.

Still another object of the present invention is to provide the actuator with a stem pusher or activator which, when the actuator is forced toward the mounting cup, the pusher or activator correspondingly forces the valve stem axially toward a bottom of the pressurizable container so as to bias the sealing head, of the valve stem, out of sealing engagement with the mating annular sealing edge, of the grommet, and thereby establish a flow path which assists with filling of the container with the desired propellant and possibly the desired food product, if the desired food product was not previously loaded within the pressurizable container.

The present invention also relates to a food product dispenser valve comprising: a mounting cup having a grommet/stem opening formed therein; a grommet having an annular sealing edge formed at an upstream end thereof and a body of the grommet extending through the grommet/stem opening, and an axial passageway extends along an axial length of the grommet to a downstream end of the passageway; an axially movable valve stem being accommodated within the passageway, and the valve stem having a sealing head, adjacent an upstream end thereof, which is spaced apart from a valve stem shoulder; and a dispensing actuator surrounding the body of the grommet which extends through the grommet/stem opening, and the dispensing actuator having a product discharge outlet formed at a downstream end thereof for discharging product; wherein a spacing of the sealing head from the valve stem shoulder is less than an axially height of the passageway defined by the grommet so that the grommet normally biases the sealing head into sealing engagement with the annular sealing edge so as to prevent flow through the food product dispenser valve.

The present invention also relates to a method of forming a food product dispenser valve, the method comprising: forming a grommet/stem opening in a mounting cup; forming an annular sealing edge at an upstream end of a grommet and passing a body of the grommet through the grommet/stem opening; defining an axial passageway in the grommet which extends along an axial length of the grommet, from adjacent the annular sealing edge and through the body to a downstream end of the passageway; accommodating an axially movable valve stem within the passageway, and forming a sealing head in the valve stem, adjacent an upstream end of the valve stem, and spacing a valve stem shoulder away from the sealing head; surrounding the body of the grommet, which extends through the grommet/stem opening, with a dispensing actuator, and forming a product discharge outlet in at a downstream end of the dispensing actuator for discharging product; and spacing the sealing head from the valve stem shoulder of the movable valve stem by a distance which is less than an axially height of the passageway defined by the grommet so that the grommet normally biases the sealing head into sealing engagement with the annular sealing edge to prevent flow through the food product dispenser valve.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 1E is a diagrammatic cross sectional view of the food product dispenser valve, similar to FIG. 1D, but along a section line of the cutouts or removed sections to show the established flow path;

FIG. 1F is a diagrammatic elevational view of the food product dispenser valve shown in the tilted position for dispensing the food product;

FIG. 1G is a diagrammatic cross sectional view of the food product dispenser valve shown in FIG. 1F;

FIG. 5 is a diagrammatic top plan view of the dispenser actuator according to the disclosure;

FIG. 5A is a diagrammatic cross sectional view of the dispenser actuator along section line 5ACEGIK-5ACEGIK of FIG. 5 showing a two arm valve stem activator;

FIG. 5B is a diagrammatic cross sectional view of the dispenser actuator of FIG. 5A along section line 5B-5B;

FIG. 5E is a diagrammatic cross sectional view of the dispenser actuator along section line 5ACEGIK-5ACEGIK of FIG. 5 showing a three arm valve stem activator;

FIG. 5F is a diagrammatic cross sectional view of the dispenser actuator of FIG. 5E along section line 5F-5F;

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein. Throughout the description, the term "upstream" is intended to mean in the flow direction toward the interior compartment defined by the pressurizable container while the term "downstream" is intended to mean in the flow direction toward the exterior environment outside the pressurizable container.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
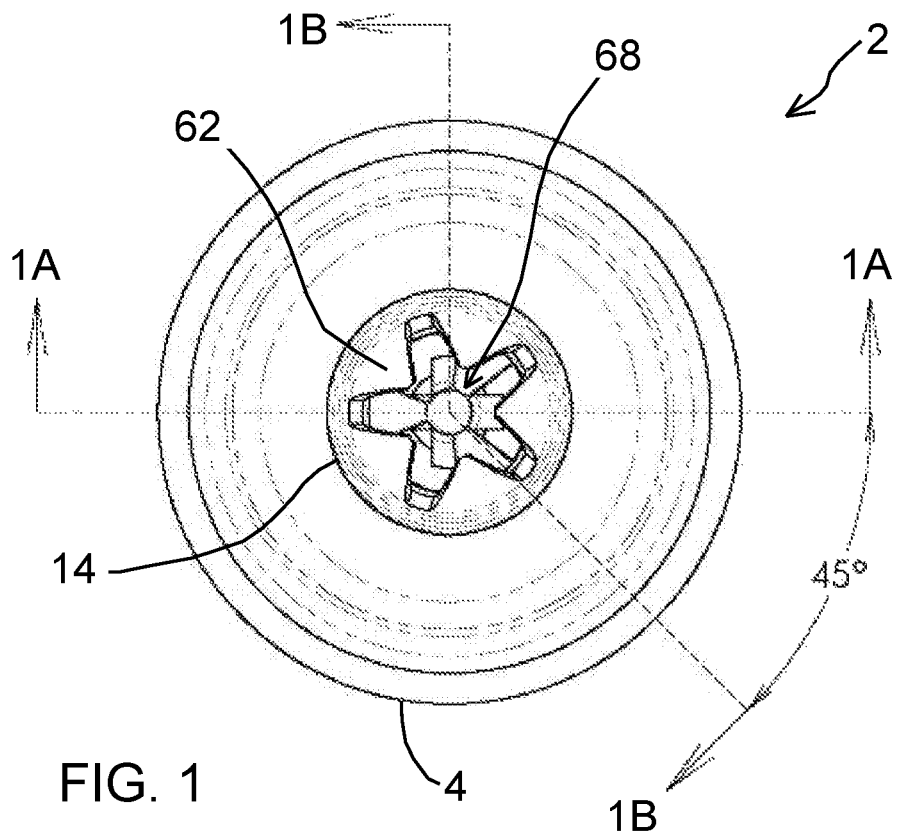
FIG. 1 is a diagrammatic top plan view of the food product dispenser valve according to the disclosure.
Figure 1B:
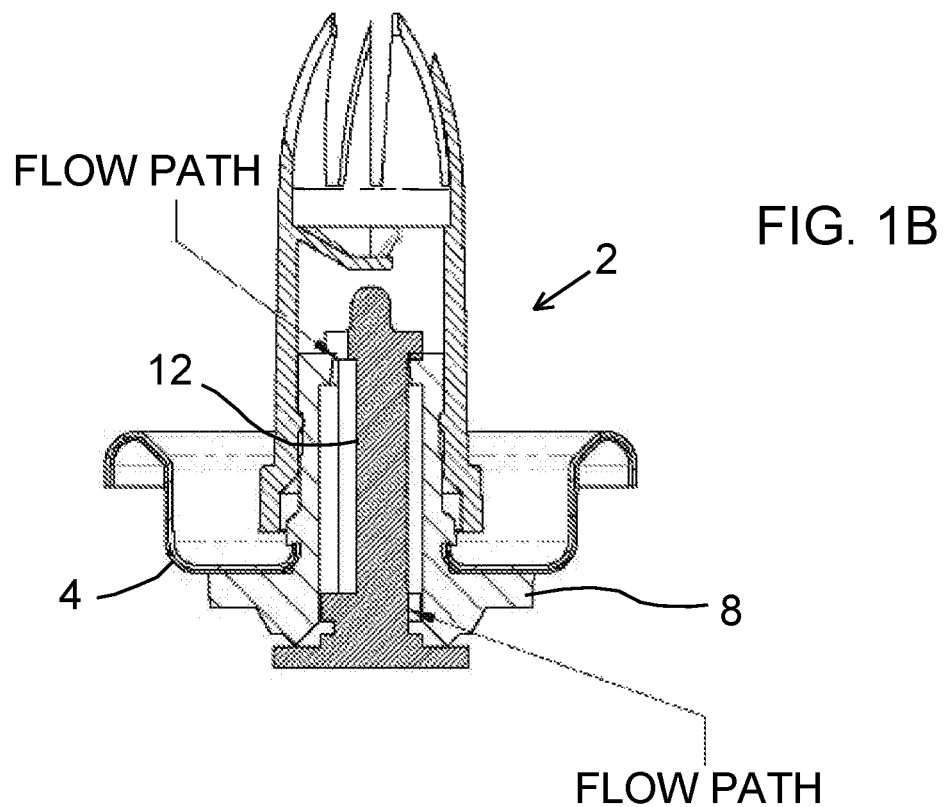
FIG. 1B is a diagrammatic cross sectional view of the food product dispenser valve along section line 1B-1B of FIG. 1.
Figure 1C:
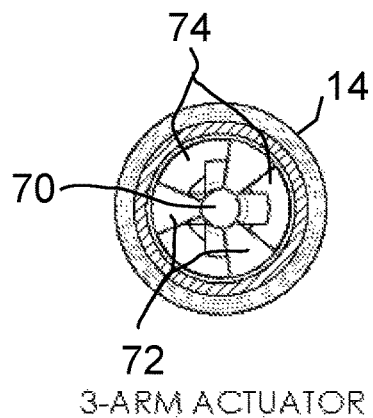
FIG. 1C is a diagrammatic cross sectional view of the food product dispenser valve along section line 1C-1C of FIG. 1A.

Turning now to FIGS. 1-1G, a brief description concerning the various components of the food product dispenser valve 2 will now be briefly discussed. As can be seen in this figure, the food product dispenser valve 2 generally comprises a mounting cup 4 which has a centrally located grommet/stem opening 6 formed therein which supports a grommet 8. The grommet 8, in turn, has a centrally located axial passageway 10 which extends along the axial length of the grommet 8 and is coincident with the grommet/stem opening 6 of the mounting cup 4. The grommet 8 supports an axially movable valve stem 12 therein. A dispensing actuator 14 surrounds an exterior surface 16 of the rubber grommet 8 and is retained by a retaining feature(s) 18, discussed below in further detail. A product discharge outlet 20 is formed in a downstream end of the dispensing actuator 14 for discharging the food product (not shown in detail) from the food product dispenser valve 2. The dispensing actuator 14 is axially movable, relative to the grommet 8, over a limited range of movement, and the purpose of such limited axial movement of the dispensing actuator 14 will become apparent from the following description.

Figure 2A:
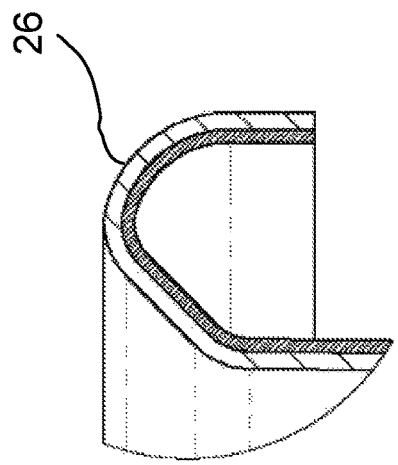
FIG. 2A is an enlarged diagrammatic cross sectional view of area 2A of FIG. 2.
Figure 2:
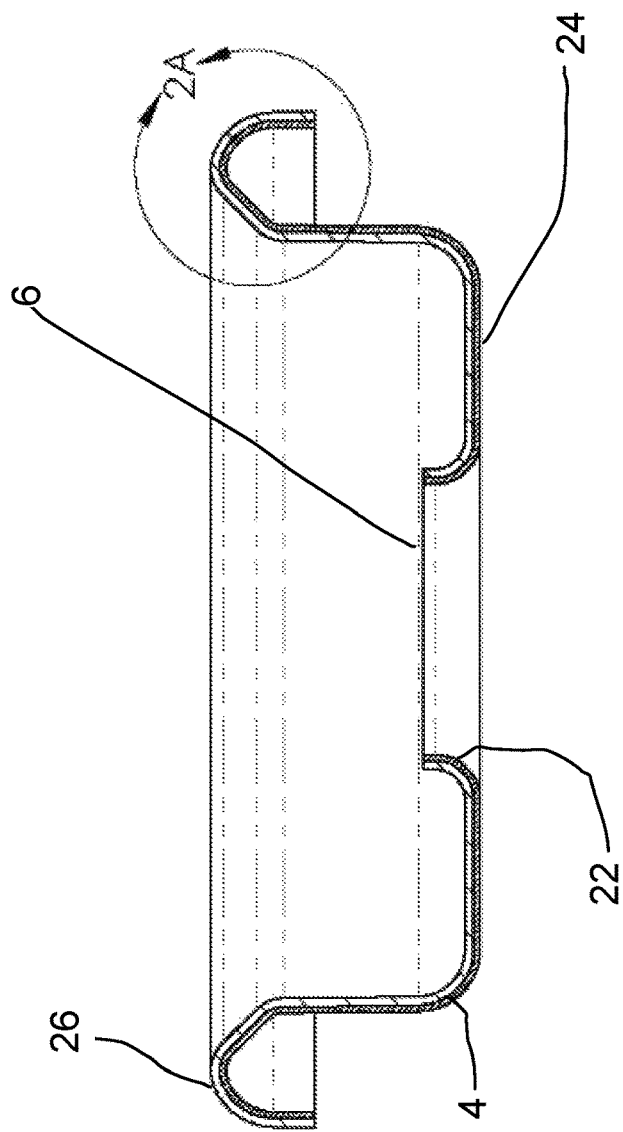
FIG. 2 is a diagrammatic cross sectional view of a mounting cup according to the disclosure.

Now turning to FIG. 2, further details concerning the mounting cup 4 will now be provided. Typically, the mounting cup 4 is stamped or manufactured from tinplate steel, or some other suitable material, and has a centrally located grommet/stem opening 6 formed therein which typically has a diameter of about 0.341±0.035 inches. An inner annular lip 22 of the mounting cup 4, which defines the central located grommet/stem opening 6, curves upwardly and extends above a top surface of a base 24 of the mounting cup 4 by distance of about 0.053±0.010 of an inch or so. In addition, as is conventional in the art, an outer perimeter edge of the mounting cup 4 has a downwardly facing peripheral curl 26 which facilitates crimping of the mounting cup 4, in a conventional manner, to a mating annular bead of a desired container (not shown in detail) so as to form a pressurizable container. As the remaining features of the mounting cup 4 are conventional and well-known in the art, a further detailed description concerning the same is not provided.

Figure 3:
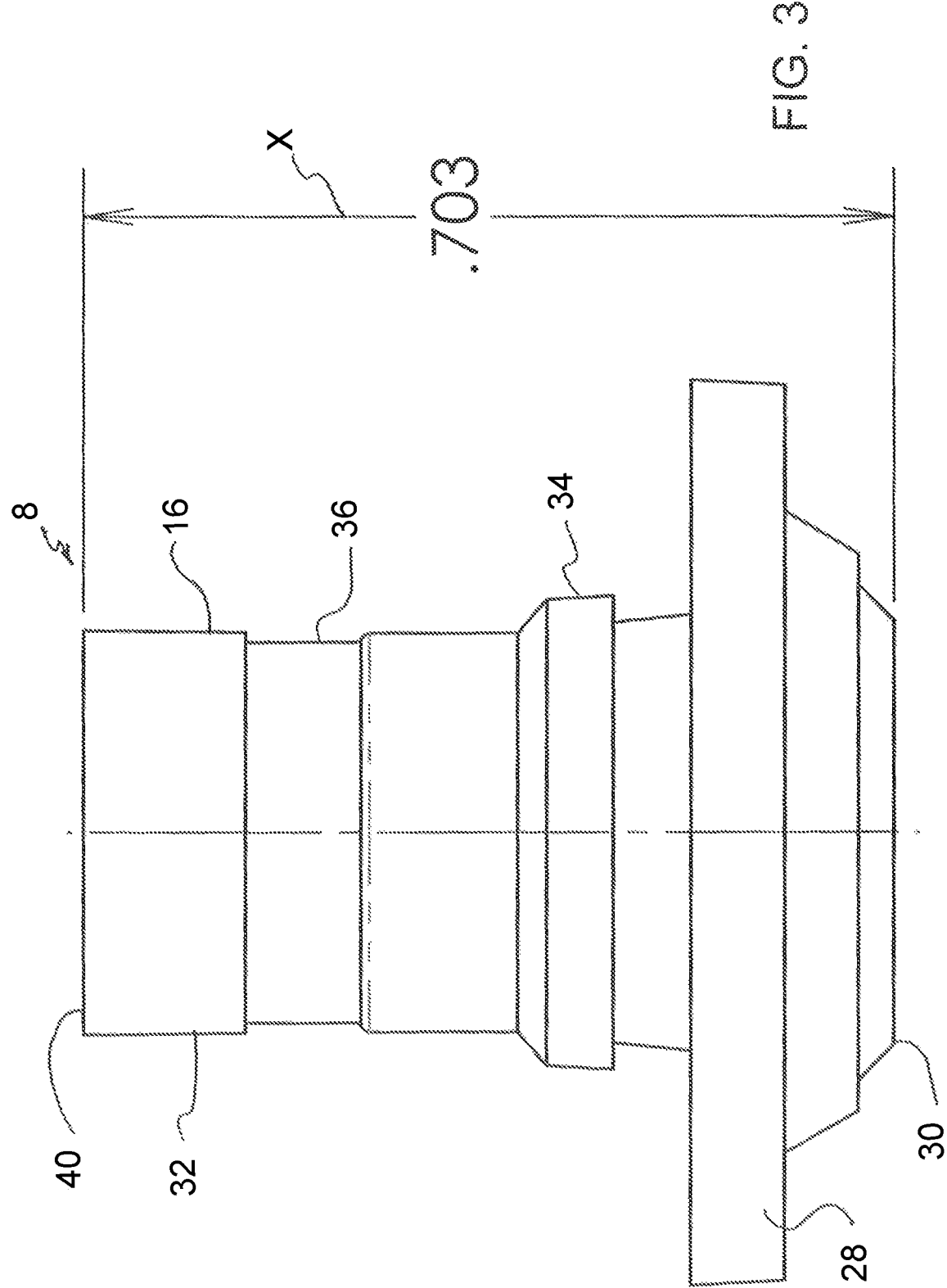
FIG. 3 is a diagrammatic front elevational view of the grommet according to the disclosure.
Figure 3A:
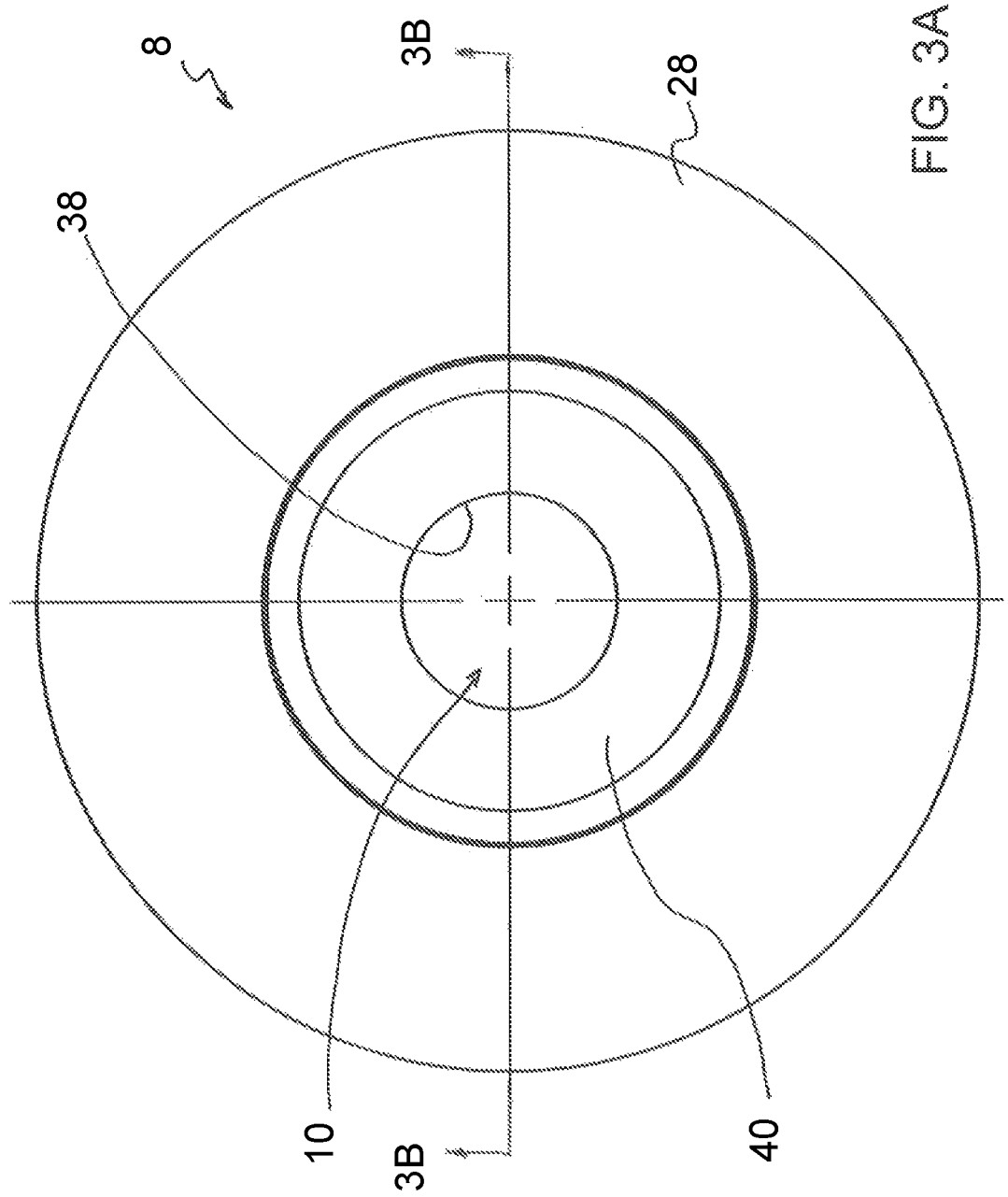
FIG. 3A is a diagrammatic top plan view of the grommet of FIG. 3.
Figure 3B:
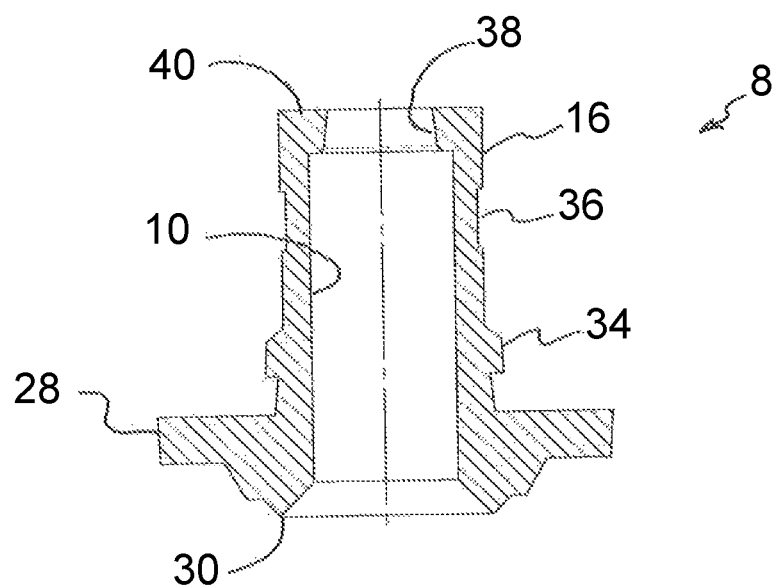
FIG. 3B is a diagrammatic cross sectional view of the grommet of FIG. 3A along section line 3B-3B.
Figure 3C:
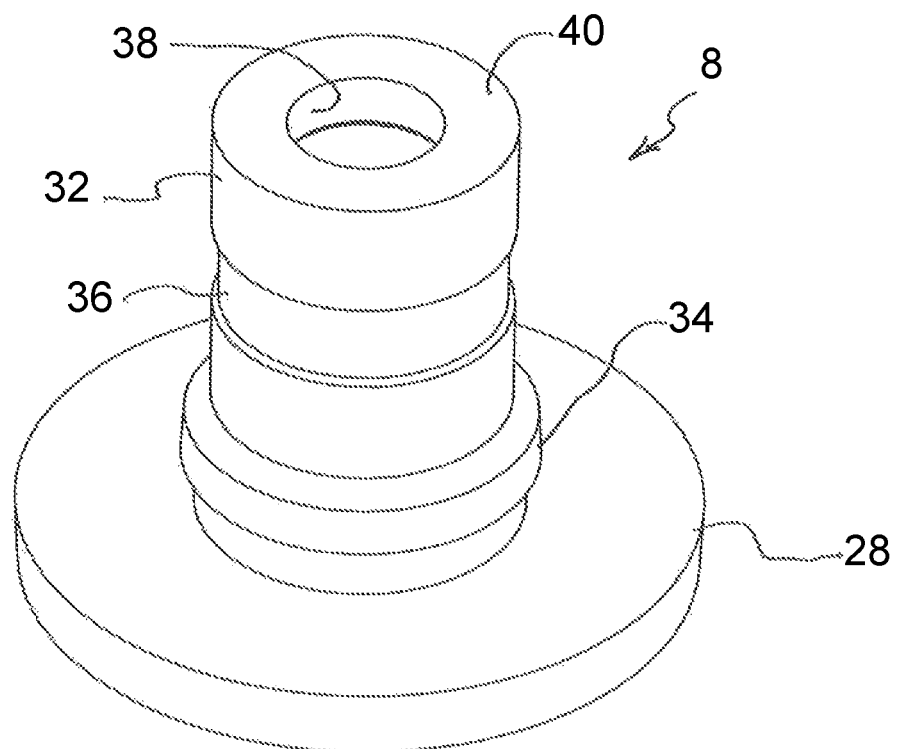
FIG. 3C is a diagrammatic perspective view of the grommet of FIG. 3.

Now turning to FIGS. 3-3C, further details concerning various features of the grommet 8 will now be provided. As shown in those figures, the grommet 8 is typically manufactured from rubber or some other similar resilient material. The grommet 8 has an enlarged base section 28 which has a diameter or dimension, e.g., 0.776±0.250 on an inch, which is larger than the diameter of the centrally located grommet/stem opening 6 formed in the mounting cup 4. This arrangement facilitates a permanent sealing engagement between a downstream facing surface of the enlarged base section 28 of the grommet 8 and an upstream facing bottom surface of the mounting cup 4. As shown, an upstream facing bottom surface of the enlarged base section 28 of the grommet 8 tapers and merges into an annular sealing edge 30 (see FIGS. 3 and 3B) which is suitable for forming seal with the valve stem 12, as will be discussed below in further detail. It is to be appreciated that the size, shape and location of the annular sealing edge can vary from application to application, without departing from the spirit and scope of the present invention, as long as the annular sealing edge 30 seals against the sealing head 42 of the valve stem 12 (see FIG. 1A), as discussed below.

As shown, the grommet 8 also a generally cylindrically shaped body 32 which extends away from the enlarged base section 28 substantially normal to the enlarged base section 28. The passageway 10, which receives and accommodates the valve stem 12, is formed within the generally cylindrically shaped body 32. The passageway 10 extends completely through both the enlarged base section 28 and the generally cylindrically shaped body 32. The passageway 10 typically has a diameter of about 0.251±0.050 inches and a length of about 0.705±0.125 inches.

A mounting cup annular shoulder 34 is formed along an exterior surface 16 of the cylindrical body 32 of the grommet 8 and the mounting cup annular shoulder 34 is spaced away from the downstream facing surface of the enlarged base section 28 by a distance equal to, or slightly less than, the axially length or height of the grommet/stem opening 6. The spacing of the mounting cup annular shoulder 34 from the downstream facing surface of the enlarged base section 28, e.g., 0.067±0.018 inches, is such that the annular lip 22 of the mounting cup 4 will be captively received and retained between an upstream surface of the mounting cup annular shoulder 34 and the downstream facing surface of the enlarged base section 28.

In addition, an annular recess 36 is formed along the exterior surface 16 of the cylindrical body 32 and the annular recess 36 is spaced from the mounting cup annular shoulder 34 by a sufficient distance so as to permit the dispensing actuator 14 to move axially, with respect to the grommet 8, over a limited range of moment relative to the grommet 8, and the purpose of such limited axial movement of the dispensing actuator 14 will become apparent from the following description. It is to be appreciated that both the annular recess 36 and the mounting cup annular shoulder 34 are sized and shaped so as to permit passage of both of the collar and the downstream facing surface of the through the centrally located grommet/stem opening 6, formed in the mounting cup 4, during assembly of the grommet 8 with the mounting cup 4. The inward curvature of the annular lip 22 of the mounting cup 4, which defines the grommet/stem opening 6, assists with assembly of the grommet 8 with the mounting cup 4.

As shown, the passageway 10 extends completely through the enlarged base section 28 and the cylindrical body 32 of the grommet 8 and terminates, at a downstream end of the grommet 8, as a circular grommet outlet 38 (see FIG. 3B). It is noted that the transverse diameter/dimension of the grommet outlet 38 is slightly smaller in size than a remainder of the passageway 10 which extends through the grommet 8. The distance or spacing (i.e., axial height) X between the annular sealing edge 30 of the grommet 8 and the flat downstream end surface 40 of the grommet 8 (see FIG. 3), through which the grommet outlet 38 extends, is slightly larger in length/height (e.g., by a distance of about 0.033±0.015 inches) than the distance or spacing Y (see FIG. 4A) between a downstream facing surface of the sealing head 42 of the valve stem 12 and an upstream facing surface of a valve stem shoulder 44, and the purpose of this relationship will become apparent from the following description.

Figure 4:
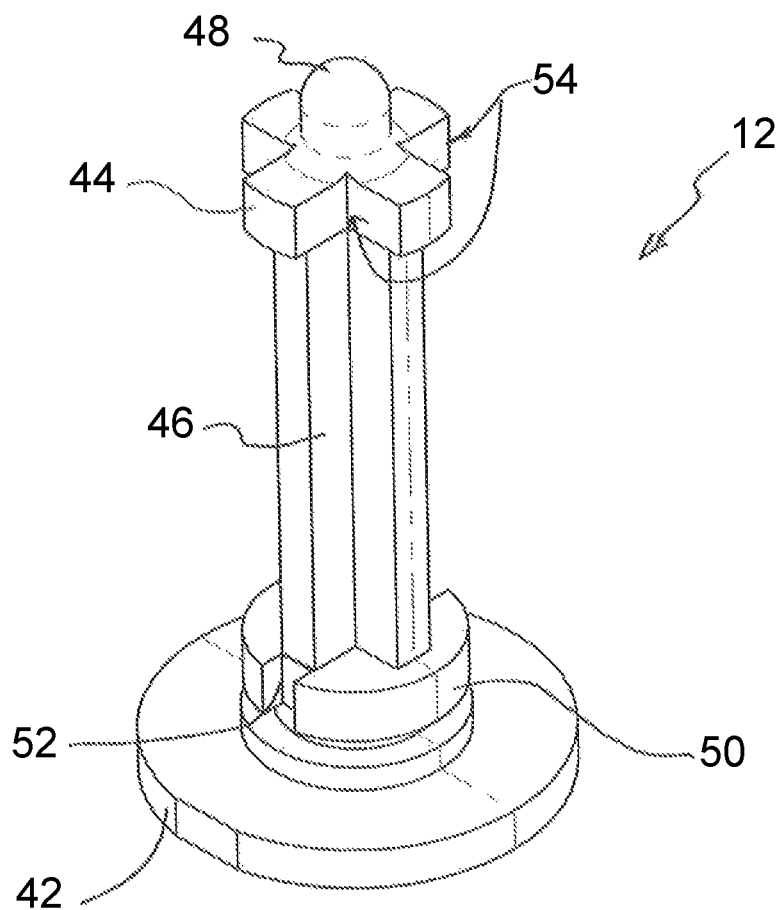
FIG. 4 is a diagrammatic perspective view of the valve stem according to the disclosure.
Figure 4A:
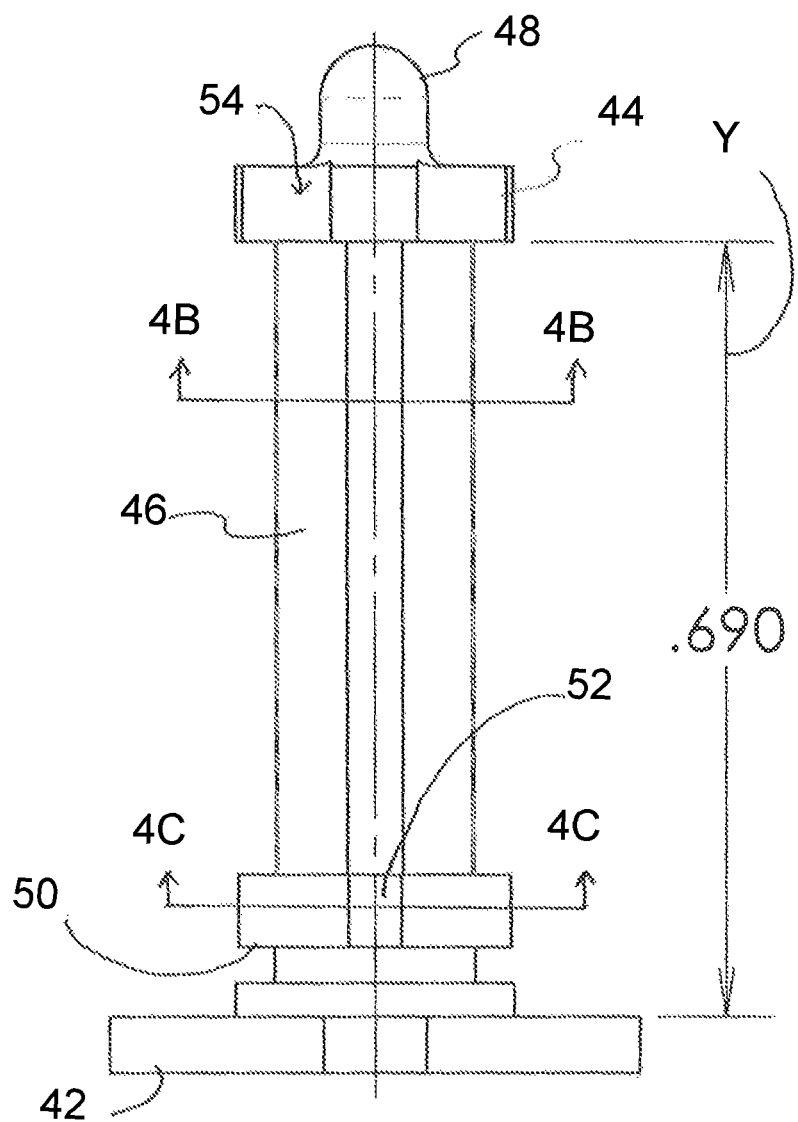
FIG. 4A is a diagrammatic front elevation view of the valve stem of FIG. 4.
Figure 4B:
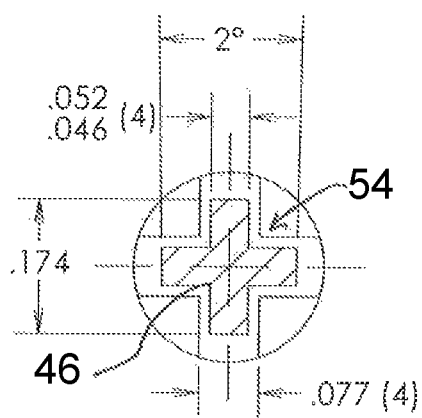
FIG. 4B is a diagrammatic cross sectional view of the valve stem of FIG. 4A along section line 4B-4B.
Figure 4C:
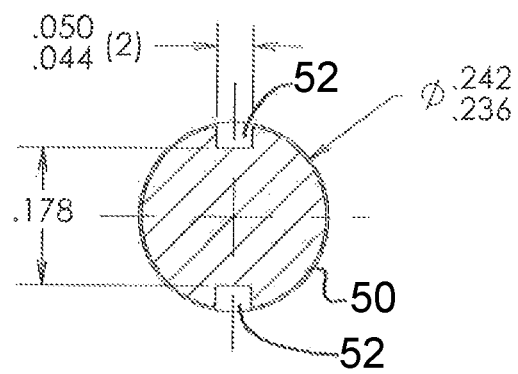
FIG. 4C is a diagrammatic cross sectional view of the valve stem of FIG. 4A along section line 4C-4C.

Now turning to FIGS. 4-4C, further details concerning various features of the valve stem 12 will now be provided. As shown, the valve stem 12 generally comprises an elongate body 46 which has a generally circular shaped sealing head 42, formed at an upstream end thereof, and a generally domed shaped surface 48, formed at an downstream end thereof. The sealing head 42 is sized and shaped so as to normally form a fluid tight seal with the annular sealing edge 30 of the grommet 8, as noted above and discussed below in further detail, to prevent the unintended flow of product therebetween.

A smaller circular disc 50 is formed on the valve stem 12 a small distance downstream of the sealing head 42. The circular disc 50 is sized and shaped so as to be snugly received within an upstream end the passageway 10 defined by the grommet 8. That is, a peripheral surface of the circular disc 50 has a small clearance with the passageway 10 of the grommet 8. As best shown in FIG. 4C, the circular disk is provided with at least one, and more preferable two or more, cutout or removed section(s) 52 which continuously permit the flow of the food product (e.g., whipped cream) through and past the circular disc 50. As the food product flows through the one or more cutouts 52 formed in the circular disc 50, such restriction and then expansion assists with inducing mixing/turbulence of the food product as the food product flows past the circular disc 50. The circular disc 50 also assists with maintaining the upstream end of the valve stem 12 generally centered with respect to the passageway 10 of the grommet 8.

As shown in FIG. 4B, the central section of the body 46 of the valve stem 12 has a generally "+" shaped cross-section shape which is sufficiently spaced from the grommet 8 so as to permits the food product to flow along the passageway 10 between an inwardly facing surface of the grommet 8, which defines the passageway 10, and the outwardly facing surface of the central section of the valve stem 12. The valve stem shoulder 44 is located downstream of the generally "+" shaped cross-section central section of the valve stem 12. The upstream facing surface of the valve stem shoulder 44 is designed normally to abut against the flat downstream end surface 40 of the grommet 8 and be pressed slightly therein so as to press into and partially deform the flat downstream end surface 40.

As shown in FIGS. 4 and 4A, for example, the "+" shaped cross-sectional profile of the valve stem shoulder 44 defines four spaced apart product flow passages 54, one flow passage is formed and defined between each adjacent pair legs of the valve stem shoulder 44 and the grommet outlet 38 of the grommet 8. Each one of these product flow passages 54 provides constant and continuous communication between the passageway 10 and the dispensing chamber 56 of the dispensing actuator 14 so as to permit any product, contained within the passageway 10, to flow out of the passageway 10 and into the dispensing chamber 56 of the dispensing actuator 14 for dispensing.

As noted above, the distance or spacing Y between a downstream facing surface of the sealing head 42 of the valve stem 12 and the upstream facing surface of the valve stem shoulder 44 is slightly smaller in length/height (e.g., by a distance of about 0.033±0.015 inches) than the distance or spacing X, between the annular sealing edge 30 of the grommet 8 and the flat downstream end surface 40 of the grommet 8. As a result of this arrangement, the sealing head 42 and the valve stem shoulder 44 normally slightly compress the grommet 8 therebetween which, in turn, causes the sealing head 42 of the valve stem 12 to be normally biased into sealing engagement with the annular sealing edge 30 due to the inherent resiliency of the grommet 8, regardless of the internal pressure of the container containing the food product dispenser valve 2, e.g., even when the container is not yet pressurized.

It is to be appreciated that the generally cylindrical or domed shaped surface 48 of the valve stem 12, formed at the downstream end of the valve stem 12, assists with insertion and guidance of the valve stem 12 into and through the passageway 10 of the grommet 8 until the valve stem shoulder 44 extends out through the grommet outlet 38 and the sealing head 42 eventually abuts against the annular sealing edge 30 to thereby prevent further insertion of the valve stem 12 into the passageway 10.

Figure 5L:
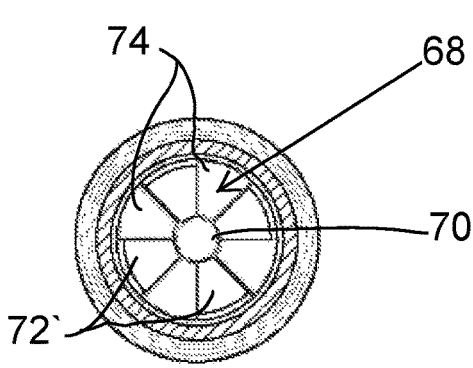
FIG. 5L is a diagrammatic cross sectional view of the dispenser actuator of FIG. 5K along section line 5L-5L.

Now turning to FIGS. 5-5L, further details concerning various features of the dispensing actuator 14 will now be provided. As shown in FIGS. 5-5B, the dispensing actuator 14 generally comprises a cylindrical or tubular body 58 which has a cylindrical opening 60, formed at an upstream end thereof, for receiving the grommet 8 as well as an inwardly tapering opposite downstream end which forms the product discharge outlet 20. A plurality of inwardly curved fingers 62, e.g., typically 3-7 or so curved fingers 62, are separated from one another by respective slots 64 to define the product discharge outlet 20. The inwardly curving fingers 62 together form what is commonly referred to in the art as a "tulip" top. Preferably, the actuator includes five or six equally spaced apart fingers 62—five (5) equally spaced fingers are shown in FIGS. 5-5L.

The cylindrical opening 60, formed at the upstream end of the dispensing actuator 14, is sized so as to have a sliding fit over the exterior surface 16 of the cylindrical body 32 of the grommet 8. An outwardly facing annular shoulder 66 is formed in an exterior surface of the dispensing actuator 14, adjacent the cylindrical opening 60, and the annular shoulder 66 is sized and shaped so as to engage with a conventional filling tool (not shown), as will be discussed below in further detail below, during filling/charging of the pressurizable container with the desired propellant, and possibly the desired food product to be dispensed, e.g., whipped cream, if the desired food product was not previously loaded inside the pressurizable container prior to crimping of the mounting cup 4 of the food product dispenser valve 2 to the pressurizable container.

An inwardly facing surface of the dispensing actuator 14 is provided with the inwardly facing retaining feature 18, such as an annular bead or two or more equally space apart inwardly facing ribs, projections, etc. The inwardly facing annular retaining feature 18 of the dispensing actuator 14 is sized and shaped to pass over the cylindrical body 32 of the grommet 8, during assembly of the dispensing actuator 14 with the grommet 8, and be captively retained within the annular recess 36. The inwardly facing annular retaining feature 18 of the dispensing actuator 14 is designed, following assembly, to be captive retained within the annular recess 36, while still permitting limited axial movement of the dispensing actuator 14 relative to the grommet 8, i.e., movement between an upstream and a downstream end of the annular recess 36.

A valve stem activator 68 is located within the dispensing chamber 56 of the dispensing actuator 14, between the inwardly facing retaining feature 18 and the product discharge outlet 20. An upstream facing surface of the valve stem activator 68 is normally located closely adjacent the downstream facing cylindrical or domed shaped surface 48 of the valve stem 12, e.g., spaced therefrom by a distance of 0.040±0.025 inches or so. The valve stem activator 68 comprising centrally located activation surface 70, which may be a generally planar, or possibly an inverted dome shaped surface which is sized, shaped and located so as to engage with the cylindrical or domed shaped surface 48 of the valve stem 12, as will be discussed below in further detail, during axial movement of the dispensing actuator 14 relative to the grommet 8 and toward the mounting cup 4.

As shown in FIGS. 5A and 5B, two arms 72 interconnect a peripheral edge of the activation surface 70 of the valve stem activator 68 with an inwardly facing surface of the dispensing actuator 14. A sufficiently sized product flow gap 74 is formed between each adjacent pair of arms 72 so as to not unduly restrict the flow of the food product past the valve stem activator 68 and out through the product discharge outlet 20.

The two generally planar arms 72, which interconnect the inwardly facing surface of the dispensing actuator 14 with the activation surface 70 of the valve stem activator 68, form an angle of about 25±15 degrees with the activation surface 70. This results in valve stem activator 68 having a generally U-shaped or cup-shaped cross sectional profile which minimizes deflection of the activation surface 70 when the dispensing actuator 14 is moved into engagement with the valve stem 12 to depress the same. That is, the end of each arm 72, connected to the activation surface 70, is located slightly upstream of the connection of the opposite end of each arm 72 to the inwardly facing surface of the dispensing actuator 14. It is to be appreciated that the valve stem activator 68 must be sufficiently robust so as to facilitate depression of the valve stem 12 and compression of the grommet 8, as discussed below in further detail, without excessively deflecting or collapsing.

Figure 5D:
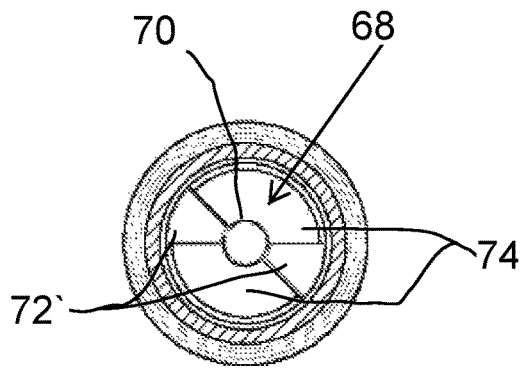
FIG. 5D is a diagrammatic cross sectional view of the dispenser actuator of FIG. 5C along section line 5D-5D.
Figure 5K:
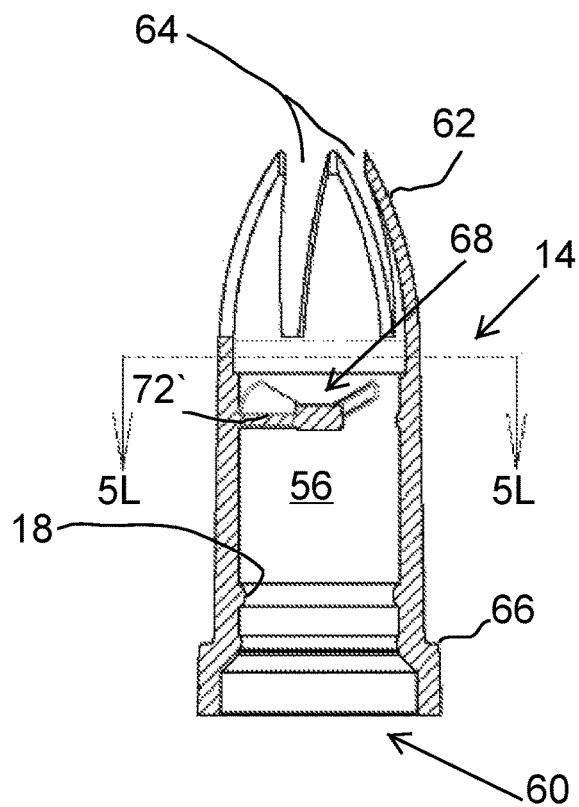
FIG. 5K is a diagrammatic cross sectional view of the dispenser actuator along section line 5ACEGIK-5ACEGIK of FIG. 5 showing a four fan valve stem activator.
Figure 5C:
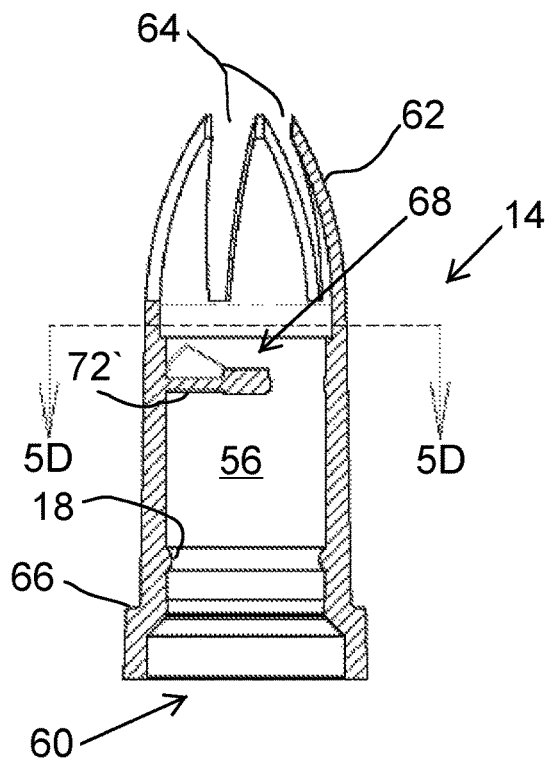
FIG. 5C is a diagrammatic cross sectional view of the dispenser actuator along section line 5ACEGIK-5ACEGIK of FIG. 5 showing a two fan valve stem activator.

As shown in FIGS. 5C and 5D, two curved vanes or fans 72'—instead of planar arms—interconnect the peripheral edge of the activation surface 70 of the valve stem activator 68 with the inwardly facing surface of the dispensing actuator 14. Each one of the curved vanes or fans 72' is also inclined and forms an angle with the flow direction of the product as the product flows into the dispensing chamber 56 and toward the product discharge outlet 20. That is, 1) the end of each of the vanes or fans 72', connected to the activation surface 70, is located upstream of the connection of the opposite end of each vanes or fans 72' to the inwardly facing surface of the dispensing actuator 14, and 2) each vane or fan 72' has a leading edge, which is located upstream, while a trailing edge thereof is located slightly downstream. Due to the inclination of the two vanes or fans 72' with respect to the flow direction of the product, e.g., each vane or fan 72' forms an angle or pitch of between 10 degrees and 65 degrees, preferably an angle or pitch of about 30±15 degrees or so, with respect to the flow direction of the product. The pitch of the two vanes or fans 72' induces a swirling or spinning motion on the product, as the product flows past the two vanes or fans 72'. It is to be appreciated that the degree of swirling or spinning induced on the product will be dictated by the flow speed of the product being dispensed and the pitch of the two vanes or fans 72'.

As shown in FIGS. 5E and 5F, three arms 72 interconnect a peripheral edge of the activation surface 70 of the valve stem activator 68 with an inwardly facing surface of the dispensing actuator 14. A sufficiently sized product flow gap 74 is formed between each adjacent pair of the three arms 72 so as to not unduly restrict the flow of the food product past the valve stem activator 68 and out through the product discharge outlet 20.

The three generally planar arms 72, which interconnect the inwardly facing surface of the dispensing actuator 14 with the activation surface 70 of the valve stem activator 68, form an angle of about 25±15 degrees. This results in valve stem activator 68 having a generally U-shaped or cup-shaped cross sectional profile which minimizes deflection or deformation of the activation surface 70 when the dispensing actuator 14 is moved into engagement with the valve stem 12 to depress the same. That is, the end of each arm 72, connected to the activation surface 70, is located upstream of the connection of the opposite end of each arm 72 to the inwardly facing surface of the dispensing actuator 14.

Figure 5J:
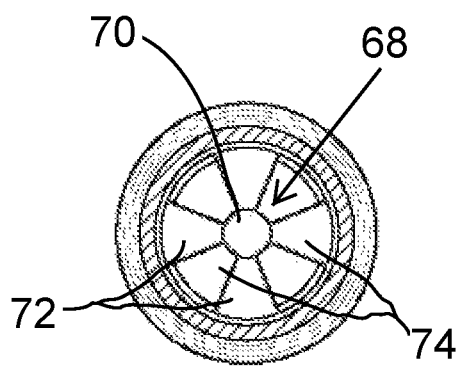
FIG. 5J is a diagrammatic cross sectional view of the dispenser actuator of FIG. 5I along section line 5J-5J.
Figure 5H:
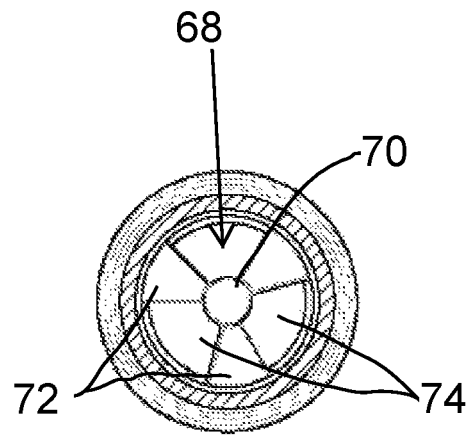
FIG. 5H is a diagrammatic cross sectional view of the dispenser actuator of FIG. 5G along section line 5H-5H.
Figure 5I:
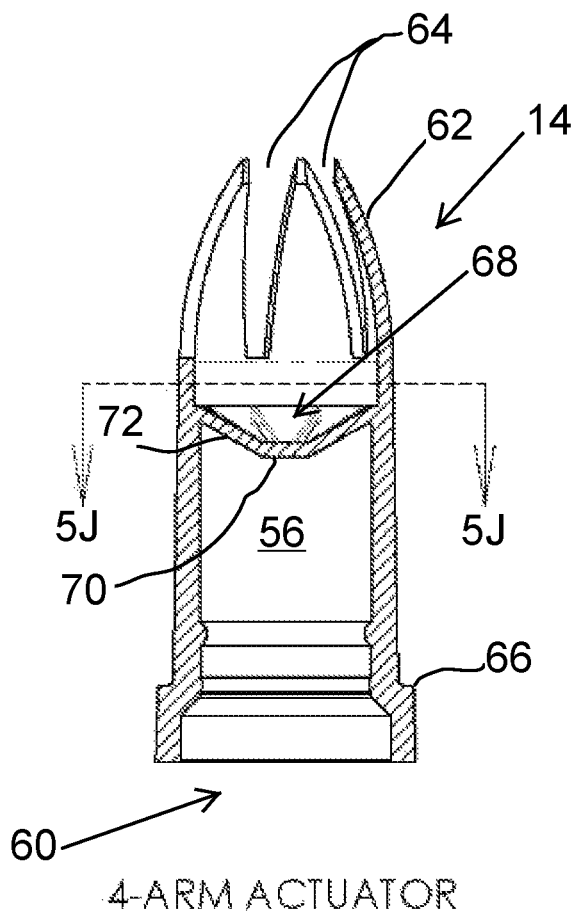
FIG. 5I is a diagrammatic cross sectional view of the dispenser actuator along section line 5ACEGIK-5ACEGIK of FIG. 5 showing a four arm valve stem activator.
Figure 5G:
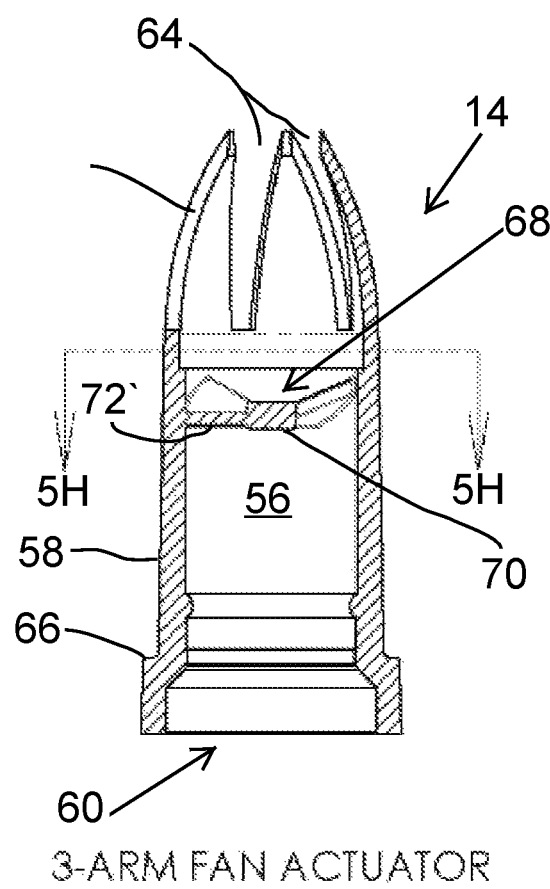
FIG. 5G is a diagrammatic cross sectional view of the dispenser actuator along section line 5ACEGIK-5ACEGIK of FIG. 5 showing a three fan valve stem activator.

As shown in FIGS. 5G and 5H, three curved vanes or fans 72'—instead of planar arms—interconnect the peripheral edge of the activation surface 70 of the valve stem activator 68 with the inwardly facing surface of the dispensing actuator 14. Each one of the three curved vanes or fans 72' is also inclined and forms an angle with the flow direction of the product as the product flows into the dispensing chamber 56 and toward the product discharge outlet 20. That is, 1) the end of each of the vanes or fans 72', connected to the activation surface 70, is located upstream of the connection of the opposite end of each vanes or fans 72' to the inwardly facing surface of the dispensing actuator 14, and 2) each vane or fan 72' has a leading edge, which is located upstream, while a trailing edge thereof is located slightly downstream. Due to the inclination of the three vanes or fans 72' with respect to the flow direction of the product, e.g., each vane or fan 72' forms an angle or pitch of between 10 degrees and 65 degrees, preferably an angle or pitch of about 30±15 degrees or so, with respect to the flow direction of the product. The pitch of the three vanes or fans 72' will induce a swirling or spinning motion on the product, as the product flows past the three vanes or fans 72'.

As shown in FIGS. 5I and 5J, four arms 72 interconnect a peripheral edge of the activation surface 70 of the valve stem activator 68 with an inwardly facing surface of the dispensing actuator 14. A sufficiently sized product flow gap 74 is formed between each adjacent pair of the four arms 72 so as to not unduly restrict the flow of the food product past the valve stem activator 68 and out through the product discharge outlet 20.

The four generally planar arms 72, which interconnect the inwardly facing surface of the dispensing actuator 14 with the activation surface 70 of the valve stem activator 68, form an angle of about 25±15 degrees. This results in valve stem activator 68 having a generally U-shaped or cup-shaped cross sectional profile which minimizes deflection or deformation of the activation surface 70 when the dispensing actuator 14 is moved into engagement with the valve stem 12 to depress the same. That is, the end of each arm 72, connected to the activation surface 70, is located upstream of the connection of the opposite end of each arm 72 to the inwardly facing surface of the dispensing actuator 14.

As shown in FIGS. 5K and 5L, four curved vanes or fans 72'—instead of planar arms—interconnect the peripheral edge of the activation surface 70 of the valve stem activator 68 with the inwardly facing surface of the dispensing actuator 14. Each one of the four curved vanes or fans 72' is also inclined and forms an angle with the flow direction of the product as the product flows into the dispensing chamber 56 and toward the product discharge outlet 20. That is, 1) the end of each of the vanes or fans 72', connected to the activation surface 70, is located upstream of the connection of the opposite end of each vanes or fans 72' to the inwardly facing surface of the dispensing actuator 14, and 2) each vane or fan 72' has a leading edge, which is located upstream, while a trailing edge thereof is located slightly downstream. Due to the inclination of the four vanes or fans 72' with respect to the flow direction of the product, e.g., each vane or fan 72' forms an angle or pitch of between 10 degrees and 65 degrees, preferably an angle or pitch of about 30±15 degrees or so, with respect to the flow direction of the product. The pitch of the four vanes or fans 72' will induce a swirling or spinning motion on the product, as the product flows past the four vanes or fans 72'.

As noted above, the upstream facing surface of the valve stem activator 68 is normally located closely adjacent the downstream facing cylindrical or domed shaped surface 48 of the valve stem 12, e.g., spaced therefrom by a distance of 0.040±0.025 inches or so. As a result of such arrangement, when the dispensing actuator 14 is moved axially, relative to the grommet 8, toward the mounting cup 4 a relatively small distance by a conventional filling tool, i.e., the annular retaining feature(s) 18 is moved from a downstream end of the annular recess 36 toward an upstream end of the annular recess 36 toward the mounting cup annular shoulder 34, such movement of the dispensing actuator 14 causes the valve stem activator 68 to move a corresponding distance and engage with the cylindrical or domed shaped surface 48 of the valve stem 12. As this movement continues to occurs, the valve stem activator 68 commence forcing the valve stem 12 axially in the upstream direction toward a bottom of the pressurizable container. As a result of such axial movement of both the dispensing actuator 14 and the valve stem 12, the upstream facing surface of the valve stem shoulder 44 is forced further into the flat downstream end surface 40 of the grommet 8 so as to compress and shorten the axial length of the cylindrical body 32 of the grommet 8.

Due to the secure attachment of the grommet 8 to the mounting cup 4 and the axial movement of the valve stem 12, the valve stem shoulder 44 commences compression of the cylindrical body 32 so that the axial length of the grommet 8 is gradually shortened. As a result of this axial movement of the valve stem 12, the sealing head 42 of the valve stem 12 gradually moves out of sealing engagement with the annular sealing edge 30 and thereby establishing a product flow path through the food product dispenser valve 2. The product filling flow path extends from the product discharge outlet 20, through the product flow gaps 74 formed between adjacent pair of arms, vanes or fans 72, 72' of the valve stem activator 68 and into and through the dispensing chamber 56 of the dispensing actuator 14, through the four spaced apart product flow passages 54 of the valve stem shoulder 44 and into the passageway 10, through the pair of cutouts 52 formed in the circular disc 50, and finally between the gap formed between the sealing head 42 and the annular sealing edge 30 and into an interior compartment of the pressurizable container. As a result of this established product filling flow path, the filling tool is able to supply at least the propellant, for dispensing the food product from the pressurizable container, and also, if desired, the desired food product to be dispensed. As such filling is conventional and well known in the art, a further description concerning the same is not provided.

After the pressurizable container is sufficiently filled with the propellant and possibly the desired food product to be dispensed—if the food product was not previously loaded within the pressurizable container—then the filling tool disengages from the dispensing actuator 14. Immediately once this occurs, the grommet 8, due to is inherent resiliency, instantly lengthens and again forces the valve stem 12 axially along the longitudinal axis, away from a bottom surface of the pressurizable container, so that the sealing head 42 of the valve stem 12 is automatically brought into sealing engagement with the annular sealing edge 30 to form again a seal between those two components and prevent the flow or discharge of the food product. In addition, the dispensing actuator 14 also generally returns back to its initially installed position to facilitate dispensing of the product to be dispensed in a conventional manner.

Figure 1A:
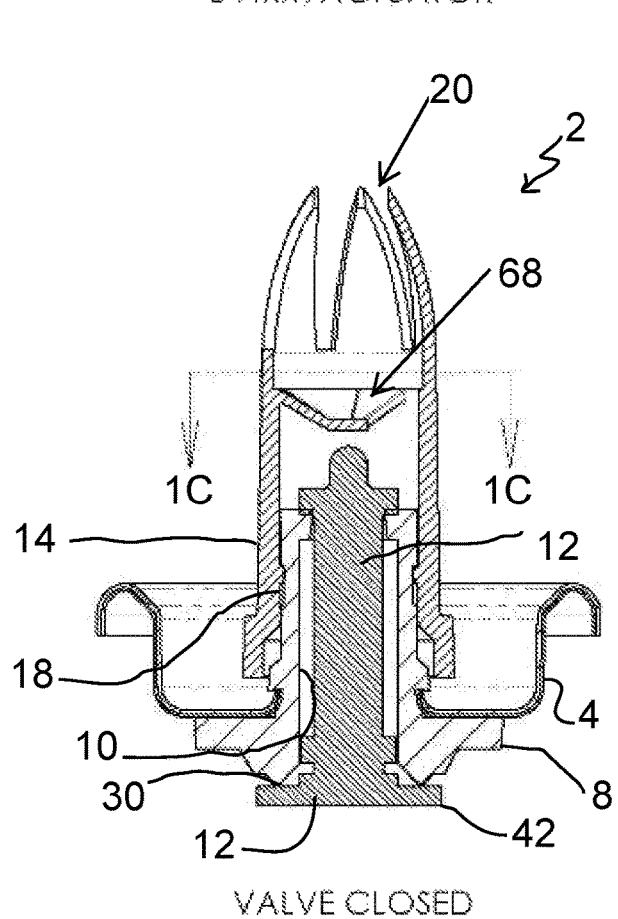
FIG. 1A is a diagrammatic cross sectional view of the food product dispenser valve along section line 1A-1A of FIG. 1.
Figure 1D:
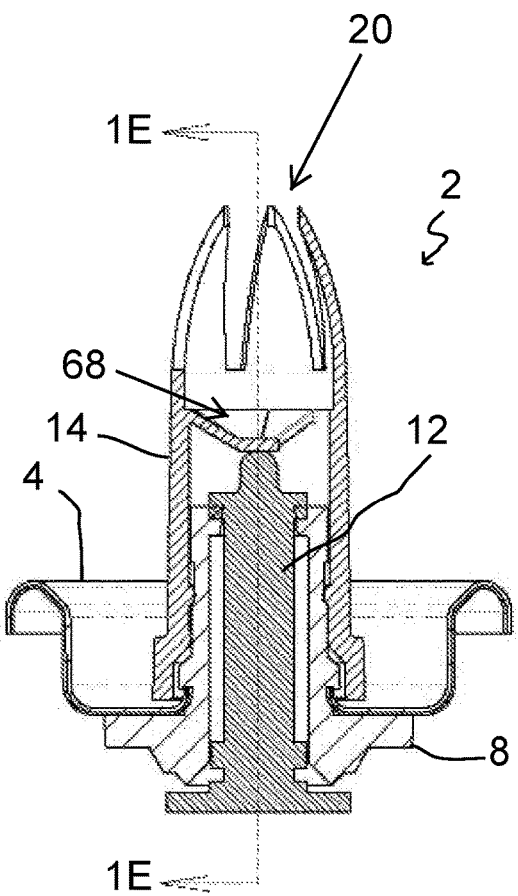
FIG. 1D is a diagrammatic cross sectional view of the food product dispenser valve, similar to FIG. 1A, but showing the valve stem activator engaged with the valve stem to "open" the food product dispenser valve during filling with the desired propellant and possibly the desired food product, if the desired food product was not previously loaded within the pressurizable container.

When the dispensing actuator 14 is actuated by an end user, e.g., the end user tilts the food product dispenser valve 2 into its dispensing position—see FIGS. 1F and 1G—a product dispensing flow path is established through the food product dispenser valve 2. That is, a portion of the sealing head 42 of the valve stem 12 is tilted out of sealing engagement with a mating portion of the annular sealing edge 30 to establish the product dispensing flow path and the propellant forces the product to flow between the spaced apart sealing head 42 and the annular sealing edge 30, through the pair of cutouts 52 formed in the circular disc 50, along the passageway 10, out through one of the four spaced apart product flow passages 54, formed between the valve stem shoulder 44 and the flat downstream end surface 40 of the grommet 8, into the dispensing chamber 56 of the dispensing actuator 14, through one of the product flow gaps 74 formed between adjacent pair of arms, vanes or fans 72, 72' of the valve stem activator 68 and finally out through the product discharge outlet 20 of the dispensing actuator 14.

As soon as the end user discontinues tilting of the food product dispenser valve 2, the grommet 8 automatically returns back to its normal state in which the grommet 8 again forces the sealing head 42 of the valve stem 12 into sealing engagement with the annular sealing edge 30. Such movement thereby discontinues the flow of product through the food product dispenser valve 2.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

We claim:

1. A food product dispenser valve comprising: a mounting cup having a grommet opening formed therein; a grommet having an annular sealing edge formed at an upstream end thereof and a body of the grommet extending through the grommet opening, and an axial passageway extends along an axial length of the grommet to a downstream end of the passageway; an axially movable valve stem being accommodated within the passageway, and the valve stem having a sealing head, adjacent an upstream end thereof, which is spaced apart from a valve stem shoulder; and a dispensing actuator surrounding the body of the grommet which extends through the grommet opening, and the dispensing actuator having a product discharge outlet formed at a downstream end thereof for discharging product; wherein a spacing of the sealing head from the valve stem shoulder is less than an axially height of the passageway defined by the grommet so that, following assembly of the food product dispenser valve, the sealing head and the valve stem shoulder compress the grommet therebetween and a resiliency of the grommet causes the sealing head to be biased into sealing engagement with the annular sealing edge so as to prevent flow through the food product dispenser valve.

2. The food product dispenser valve according to claim 1, wherein the grommet has an enlarged base section which is larger than a diameter of the grommet opening to facilitate a sealing engagement between the enlarged base section and the mounting cup, and an upstream facing bottom surface of the enlarged base section transitions into the annular sealing edge.

3. The food product dispenser valve according to claim 2, wherein the grommet has a cylindrically shaped body which extends from the enlarged base section and normal to the enlarged base section, a mounting cup annular shoulder is formed along the cylindrical body and spaced from the enlarged base section by a distance equal to or less than an axially height of the grommet opening so that an annular lip of the mounting cup is captively received and retained between the mounting cup annular shoulder and the enlarged base section.

4. The food product dispenser valve according to claim 3, wherein an annular recess is formed in the cylindrical body, spaced from the mounting cup annular shoulder, and the annular recess cooperates with a mating annular retaining feature of the dispensing actuator so as to permit the dispensing actuator to move axially, relative to the grommet, over a limited range of moment.

5. The food product dispenser valve according to claim 4, wherein an inwardly facing surface of the dispensing actuator is provided with the annular retaining feature, and the annular retaining feature is designed, following assembly, to be retained within the annular recess while still permitting limited axial movement of the dispensing actuator relative to the grommet.

6. The food product dispenser valve according to claim 2, wherein the passageway extends completely through the enlarged base section and the body and terminates, at a downstream end of the grommet, as a circular grommet outlet formed in a flat downstream end surface of the grommet, and a spacing between the annular sealing edge and the flat downstream end surface, through which the grommet outlet extends, is larger in length and height than a spacing between a downstream facing surface of the sealing head and an upstream facing surface of a valve stem shoulder.

7. The food product dispenser valve according to claim 1, wherein the mounting cup annular shoulder is sized and shaped so as to permit passage of thereof through the grommet opening, formed in the mounting cup, during assembly of the grommet with the mounting cup.

8. The food product dispenser valve according to claim 1, wherein a smaller circular disc is formed on the valve stem, downstream from the sealing head, and the circular disc is sized and shaped so as to be received within an upstream end the passageway of the grommet, and the circular disc has at least one cutout or removed section formed therein which continuously permits the flow of the food product through and past the circular disc.

9. The food product dispenser valve according to claim 1, wherein a central section of the valve stem has a "+" shaped cross-section which permits the food product to flow along the passageway, between an inwardly facing surface of the grommet, which defines the passageway, and an outwardly facing surface of the central section of the valve stem, and the valve stem shoulder is located downstream of the "+" shaped cross-section central section and is designed to abut against a flat downstream end surface of the grommet and press into and partially deform the flat downstream end surface, and the valve stem shoulder assists with forming product flow passages between the valve stem shoulder and the flat downstream end surface of the grommet which provide constant communication between the passageway and a dispensing chamber of the dispensing actuator.

10. The food product dispenser valve according to claim 1, wherein the dispensing actuator comprises a tubular body which has a cylindrical opening, formed at an upstream end thereof, for receiving the grommet and has an inwardly tapering opposite downstream end which forms the product discharge outlet.

11. The food product dispenser valve according to claim 10, wherein a plurality of inwardly curved fingers are separated from one another by respective slots to define the product discharge outlet, and the inwardly curving fingers together form a "tulip" top.

12. The food product dispenser valve according to claim 10, wherein the cylindrical opening is sized so as have a sliding fit over a body of the grommet, and an annular shoulder is formed in an exterior surface of the dispensing actuator, adjacent the cylindrical opening, which is sized and shaped for engage with a filling tool during a filling operation.

13. The food product dispenser valve according to claim 10, wherein a valve stem activator is located within a dispensing chamber of the dispensing actuator, between an inwardly facing retaining feature and the product discharge outlet, and the valve stem activator is located adjacent a domed shaped surface of the valve stem.

14. The food product dispenser valve according to claim 13, wherein two arms, vanes or fans interconnect a peripheral edge of an activation surface of the valve stem activator with an inwardly facing surface of the dispensing actuator, and a product flow gap is formed between the two arms, vanes or fans so as to not unduly restrict the flow of the food product past the valve stem activator through the product discharge outlet.

15. The food product dispenser valve according to claim 13, wherein three arms, vanes or fans interconnect a peripheral edge of an activation surface of the valve stem activator with an inwardly facing surface of the dispensing actuator, and a product flow gap is formed between each adjacent pair of the three arms, vanes or fans so as to not unduly restrict the flow of the food product past the valve stem activator through the product discharge outlet.

16. The food product dispenser valve according to claim 13, wherein four arms, vanes or fans interconnect a peripheral edge of an activation surface of the valve stem activator with an inwardly facing surface of the dispensing actuator, and a product flow gap is formed between each adjacent pair of the four arms, vanes or fans so as to not unduly restrict the flow of the food product past the valve stem activator through the product discharge outlet.

17. A method of forming a food product dispenser valve, the method comprising: forming a grommet opening in a mounting cup; forming an annular sealing edge at an upstream end of a grommet and passing a body of the grommet through the grommet opening; defining an axial passageway in the grommet which extends along an axial length of the grommet, from adjacent the annular sealing edge and through the body to a downstream end of the passageway; accommodating an axially movable valve stem within the passageway, and forming a sealing head in the valve stem, adjacent an upstream end of the valve stem, and spacing a valve stem shoulder away from the sealing head; surrounding the body of the grommet, which extends through the grommet opening, with a dispensing actuator, and forming a product discharge outlet in at a downstream end of the dispensing actuator for discharging product; and spacing the sealing head from the valve stem shoulder of the movable valve stem by a distance which is less than an axially height of the passageway defined by the grommet so that, following assembly of the food product dispenser valve, the sealing head and the valve stem shoulder compress the grommet therebetween and a resiliency of the grommet causes the sealing head to be biased into sealing engagement with the annular sealing edge the sealing head into sealing engagement with the annular sealing edge to prevent flow through the food product dispenser valve.

18. A food product dispenser valve comprising: a mounting cup having a grommet opening formed therein; a grommet having an annular sealing edge formed at an upstream end thereof and a body of the grommet extending through the grommet opening, and an axial passageway extends along an axial length of the grommet to a downstream end of the passageway; an axially movable valve stem being accommodated within the passageway, and the valve stem having a sealing head, adjacent an upstream end thereof, which is spaced apart from a valve stem shoulder, a domed shaped surface being located upstream of and directly adjacent the valve stem shoulder, and an upstream end of the valve stem being reduced in size from the valve stem shoulder to the domed shaped surface; and a dispensing actuator surrounding the body of the grommet which extends through the grommet opening, and the dispensing actuator having a product discharge outlet formed at a downstream end thereof for discharging product; wherein a spacing of the sealing head from the valve stem shoulder is less than an axially height of the passageway defined by the grommet so that, following assembly of the food product dispenser valve, the sealing head and the valve stem shoulder compress the grommet therebetween and a resiliency of the grommet causes the sealing head to be biased into sealing engagement with the annular sealing edge so as to prevent flow through the food product dispenser valve.

* * * * *